(12) United States Patent
Kumar et al.

(10) Patent No.: US 11,943,385 B1
(45) Date of Patent: Mar. 26, 2024

(54) DYNAMIC CROSS-SERVICE USAGE ENFORCEMENT FOR USAGE MEASURED ACROSS MULTIPLE DIFFERENT NETWORK-BASED SERVICES

(71) Applicant: Amazon Technologies, Inc., Seattle, WA (US)

(72) Inventors: Ankit Kumar, Bellevue, WA (US); Iulian Catalin Stafie, Seattle, WA (US); Lisa A Winn, Seattle, WA (US); Marius Popa, Kirkland, WA (US); Jamie Layne White, Seattle, WA (US); Dennis Ono Tjandra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 124 days.

(21) Appl. No.: 16/917,587

(22) Filed: Jun. 30, 2020

(51) Int. Cl.
*H04M 15/00* (2006.01)

(52) U.S. Cl.
CPC .......... *H04M 15/50* (2013.01); *H04M 15/58* (2013.01); *H04M 15/60* (2013.01); *H04M 15/8214* (2013.01); *H04M 15/886* (2013.01)

(58) Field of Classification Search
CPC ..... H04L 67/10; H04L 47/70; H04L 41/5003; H04L 67/22; H04L 12/14
See application file for complete search history.

(56) References Cited

U.S. PATENT DOCUMENTS

| | | | |
|---|---|---|---|
| 9,043,458 B2 | 5/2015 | Balaji et al. | |
| 9,870,238 B2 | 1/2018 | Astete et al. | |
| 2011/0051615 A1* | 3/2011 | Yu | H04L 41/5029 370/252 |
| 2013/0097203 A1* | 4/2013 | Bhattacharjee | G06F 21/604 707/783 |
| 2019/0259097 A1* | 8/2019 | Raleigh | G06Q 20/0855 |
| 2020/0045519 A1* | 2/2020 | Raleigh | H04W 4/24 |

\* cited by examiner

*Primary Examiner* — Pakee Fang

(74) *Attorney, Agent, or Firm* — S. Scott Foster; Kowert, Hood, Munyon, Rankin & Goetzel, P.C.

(57) ABSTRACT

Cross-service usage is dynamically enforced for different network-based services. A cross-service control system may accept requests to specify a usage quota for a client for an interface of a network-based service. A rule to enforce the usage quota may be distributed to request handling nodes for the service. Usage measurements may be collected from the request handling nodes for requests received from the client via the interface. An update to the usage quota may be determined from an evaluation of the usage measurements. The rule at the request handling nodes may be updated to enforce the updated usage quota.

20 Claims, 9 Drawing Sheets

DYNAMIC CROSS-SERVICE USAGE ENFORCEMENT FOR USAGE MEASURED ACROSS MULTIPLE DIFFERENT NETWORK-BASED SERVICES

BACKGROUND

A cloud provider, or other provider network, may implement multiple network-based services. These services may provide different functionality, such as computational resources, storage resources, data transmission, among various others. To maximize efficiency of resource consumption, these services may operate in a multi-tenant fashion. Multi-tenancy may enables provider networks to offer a "shared" platform and allow resources to be used efficiently.

Figure 1:
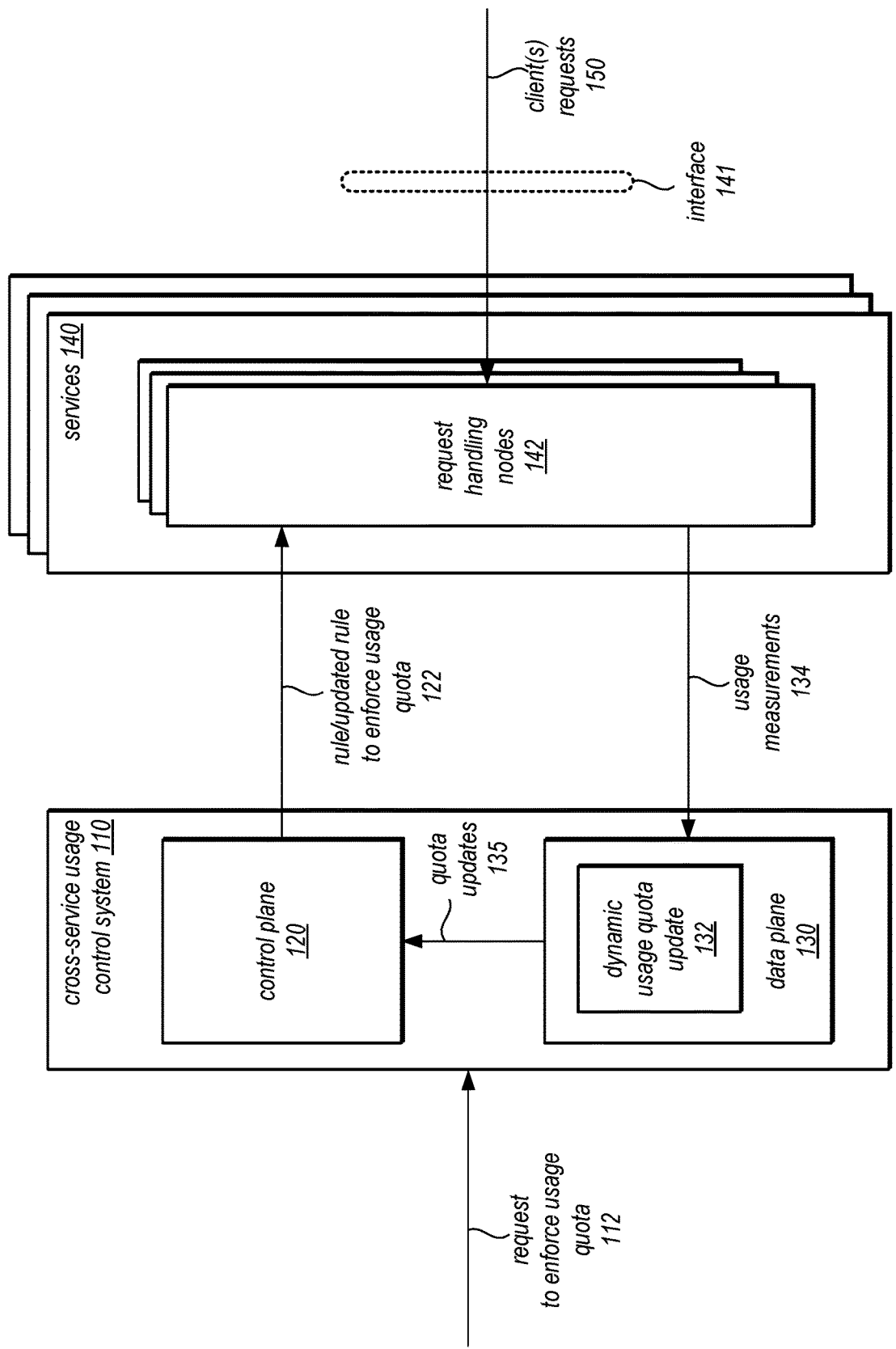
FIG. 1 illustrates a logical block diagram of dynamic cross-service usage enforcement, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Multi-tenancy may allow resource sharing for different network-based services implemented in a provider network. However, multi-tenancy may also result in over consumption of resources by one tenant (e.g., one or more client systems or applications, associated client systems or client applications, or other associated requests, such as requests linked to a user account, organization, or customer) leading to a degraded experience for other tenants or for management operations also being performed as part of implementing the various services.

Various techniques for implementing dynamic cross-service usage enforcement are described herein. Dynamic cross-service usage enforcement may be implemented to ensure that all tenants as well as service operations receive a specified share of resources without interference, in various embodiments. In various embodiments, for those tenants that breach or otherwise exceed their specified usage quotas, the breaching tenants may be limited from continuing to exceed the specified usage quota, which may otherwise cause degraded performance for other tenants or other service operations. For example, network management techniques may be applied such as "throttling" or otherwise reducing traffic by a network device (e.g., by dropping or rejecting requests received in excess of a number or rate that exceeds a usage quota) such that the downstream system does not get overloaded. Instead of (or in addition to) each service building individual resource protection logic which leads to duplicate work across services and inconsistent resource consumption experiences for tenants across services, a centralized usage enforcement system that can compute resource usage across multiple services and enforce fair resource usage across the multiple services may be implemented, providing a consistent experience for client applications that may experience usage enforcement and for the services protected by usage enforcement. Moreover, the dependencies or interactions between services may be discovered or considered for making enforcement decisions. In various embodiments, the cross-service usage control may dynamically adapt to usage information across services to modify the rules or other controls that enforce usage quotas and may reduce or eliminate the work to build or maintain usage controls at individual services.

FIG. 1 illustrates a logical block diagram of dynamic cross-service usage enforcement, according to some embodiments. Cross-service usage control system 110 may implement various techniques to enforce usage across different services 140. Cross-service usage control system 110 and/or services 140 may be implemented as part of public and/or private clouds, such as a public provider network discussed below with regard to FIG. 2 implemented across one or multiple regions, or as part of a private cloud system in order to enforce usage across privately implemented services. Cross-service usage control system 110 and services 140 may be implementing using multiple different computing devices (e.g., computing nodes), such as computing system 1000 discussed below with regard to FIG. 9. Services 140 may implement various types of compute, processing, storage, or resources or operations on behalf of clients in multi-tenant fashion.

As discussed above, services like services 140 may be multi-tenant, in some embodiments, sharing resources between different tenants. Multi-tenant services may, in some embodiments, implement different resources for different clients on shared underlying hardware (e.g., same servers hosting different resources). For example, in some embodiments, multi-tenant services may include multi-tenant hosting of resources and performance of requests (e.g., multi-tenant storage system that stores on a same storage device data for different clients and a common request-handling front end to access data for the different clients). In some embodiments, multi-tenant services may implement different resources for different clients on separate underlying hardware (e.g., different servers hosting different resources) but still may apply multi-tenant processing to the implementation of the service overall (e.g., using shared resources to handle various types of management requests for the independently hosted resources for different clients may consume a specified usage for a client to perform that type of management operation using shared network bandwidth and management request handling resources). Thus, in some embodiments, multi-tenant implementation of a service may not include, for example, multi-tenant storage, placement, or operation of all aspects of client's requests, but may be multi-tenant in the implementation of a portion of the performance of a request.

As illustrated in FIG. 1, cross-service usage control system 110 may implement a control plane 120 for performing various management operations and handling management requests, like request to enforce a usage quota 112, in some embodiments. For example, control plane 120 may implement an interface or front-end system that handles requests, like those discussed below with regard to FIG. 2. Control plane 120 may receive a request to enforce a usage quota 112, generate a rule (or rules) to enforce the usage quota, and then distribute the rule to enforce the usage quota, as indicated at 122, to request handling nodes 142.

The request 112 may specify, for instance, the interface of the service (e.g., an Application Programming Interface (API), command, instruction, or other operation supported by the interface), such as 141, and the client(s) against which the usage quota is to be enforced (e.g., a tenant identifier, such as a user account, customer account, organization, group, etc.). Different requests and different quotas may be specified for different client(s) (e.g., different tenants may have the same or different usage quota). In various embodiments, a usage quota may be specified across one or more usage measurements (e.g., time to perform a request, number of resources used to process a request, such as processor, storage, network bandwidth, and/or rate of operations to perform the request (e.g., Transactions Per Second (TPS), Requests Per Second (RPS), data rates like Bytes Per Second (BPS), and/or I/O Operations Per Second (IOPS)). As discussed below with regard to FIG. 3, various formats for specifying usage quotas for enforcement may be supported.

Request handling nodes 142 may be implemented as part of services 140 to accept requests from clients (e.g., client applications of a service, other services that utilize the service as a client, etc.). For example, as indicated at 150, client requests directed to an interface 141 may be received, processed, or otherwise handled by request handling nodes to start, initiate, dispatch, direct, and/or otherwise complete client(s) requests 150. The rule to enforce the usage quota specified for the client(s) for requests via interface 141 may be enforced by request handling nodes. In some embodiments, request handling nodes 142 may be able to accept and enforce rules (or updated rules). In some embodiments, a request enforcement agent deployed, managed, or directed by cross-service usage control system (e.g., rule enforce agent 412 in FIG. 4) may be implemented or deployed to request handling nodes 142. For requests 150 that exceed a usage quota, request handling nodes 142 may drop, deny, ignore, or otherwise reduce the requests received from clients 150 performed in order to be within the usage quota.

Usage information, such as usage measurements 134, that are collected by request handling nodes 142 (or from other service components that provide that information to request handling nodes 142) may be provided back to usage control system 110 in order to synchronize usage information across request handling nodes 142 (as discussed below with regard to FIG. 4). Usage measurements 134 may also be stored as part of data plane 130 for analysis to determine the usage of requests to make more accurate enforcement decisions at request handling nodes and make dynamic changes to usage quotas, as indicated 132. For example, as discussed below with regard to FIG. 5, time range and other types of analysis to determine dependencies between different services and the overall utilization log records indicating usage measurements 142 to determine if adjustments to quotas (or rules to enforce quotas) may be optimal. Quota updates 135 can be provided to control plane 120 for distribution to request handling nodes 142, in some embodiments. In some embodiments, these quota updates 135 may be provided as a recommendation to a service operator or other entity responsible for request enforcement of a usage quota, as indicated at 112. In this way, the quota updates can be confirmed or requested for application before being applied. In some embodiments, quota updates may be automatically performed.

The previous description of a cross-service usage control system 110 in FIG. 1 is a logical illustration and thus is not to be construed as limiting as to the architecture for implementing a cross-service usage control system 110.

This specification begins with a general description of a provider network that implements a usage control system for different services across provider network regions. Then various examples of the usage control service including different components/modules, or arrangements of components/module that may be employed as part of implementing the usage control service are discussed. A number of different methods and techniques to implement dynamic cross-service usage enforcement are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
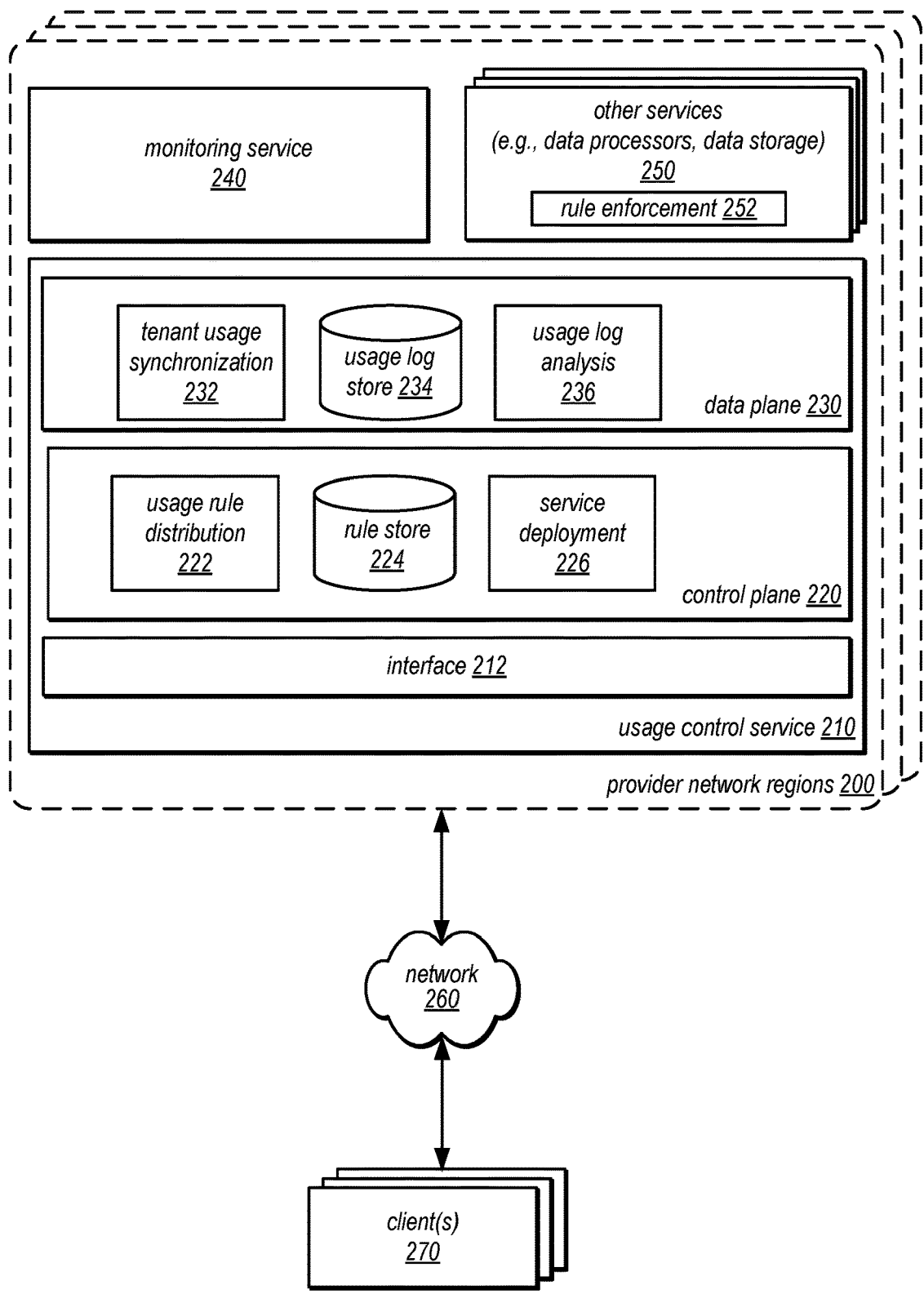
FIG. 2 is a logical block diagram illustrating a provider network implementing a usage control service for services implemented by the provider network, according to some embodiments.

FIG. 2 is a logical block diagram illustrating a provider network implementing a usage control service for services implemented by the provider network, according to some embodiments. In various embodiments, a provider network may be a private or closed system or may be set up by an entity such as a company or a public sector organization to provide one or more services (such as various types of cloud-based storage, processing, or other computing resources) accessible via the Internet and/or other networks to clients 270. The provider network may be implemented in a single location or may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and storage services offered by the provider network.

For example, the provider network (which may, in some implementations, be referred to as a "cloud provider network" or simply as a "cloud") may refer to a pool of network-accessible computing resources (such as compute, storage, and networking resources, applications, and services), which may be virtualized or bare-metal (e.g., providing direct access to underlying hardware without a virtualization platform). In this way, the provider network can provide convenient, on-demand network access to a shared pool of configurable computing resources that can be programmatically provisioned and released in response to customer commands. These resources can be dynamically provisioned and reconfigured to adjust to variable load.

The provider network can be formed as a number of regions, such as provider network regions 200, where a region may be a separate geographical area in which the provider network clusters or manages data centers, in some embodiments. Each region 200 may include two or more availability zones (sometimes referred to as fault tolerant zones) connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one another that the same natural disaster should not take more than one availability zone offline at the same time. Clients 270 can connect to availability zones of the provider network via a publicly accessible network (e.g., the Internet, a cellular communication network). Regions 200 may be connected to a global network which includes private networking infrastructure (e.g., fiber connections controlled by the cloud provider) connecting each region to at least one other region. The provider network may deliver content from points of presence outside of, but networked with, these regions 200 by way of edge locations and regional edge cache servers. This compartmentalization and geographic distribution of computing hardware enables the provider network to provide low-latency resource access to customers on a global scale with a high degree of fault tolerance and stability.

In some embodiments, a provider network may implement various computing resources or services across one or more regions, such as usage control service 210, monitoring service 240, and other services 250, which may include a virtual compute service, data processing service vcR(s) (e.g., map reduce, data flow, and/or other large scale data processing techniques), data storage services (e.g., object storage services, block-based storage services, or data warehouse storage services) and/or any other type of network-based services (which may include various other types of storage, processing, analysis, communication, event handling, visualization, and security services not illustrated). The resources used to support the operations of such services (e.g., compute and storage resources) may be provisioned in an account associated with the provider network, in contrast to resources requested by users of the provider network 200, which may be provisioned in user accounts, in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system 1000 illustrated in FIG. 9 and described below. In various embodiments, the functionality of a given system or service component (e.g., a component of usage control service 210 or other services 250) may be implemented by a particular node or may be distributed across several nodes. In some embodiments, a given node may implement the functionality of more than one service system component (e.g., more than one data store component).

Usage control service 210 may implement dynamic cross-service usage enforcement, as discussed above with regard to FIG. 1 and below with regard to FIGS. 3-5. Usage control service 210 may provide operators of other services 250 and monitoring service 240, with the ability to enforce usage quotas for tenants (e.g., client(s) associated with a common user account, customer account, organization, role, or other association). By specifying usage controls through usage control service 210, an operator of a service can benefit from the cross-service usage analysis and control of usage control service so that each service does not implement individual usage control schemes that cause disruptions to dependent services, in some embodiments. Usage control service 210 may also dynamically update the usage quotas for tenants according to an analysis of actual use (e.g., automatically or in response to requests to apply a recommended updated to a usage quota).

Usage control service 210 may implement interface 212. Interface 212 may be a programmatic interface (e.g., supporting one or more APIs), graphical (e.g., providing a web-based console or other graphical control), and/or command line interfaces, in various embodiments, to allow for the specification and management of usage quotas for tenants on behalf of services (e.g., services 250). As discussed in detail below with regard to FIG. 3, interface 212 can support different operations in addition to specifying a usage quota, such as operations to register a service for usage control, modify a usage quota, confirm a recommendation to update a usage quota, or obtain access to usage data collected by usage control service, in some embodiments.

Usage control service 210 may implement control plane 220, in various embodiments, which may be similar to control plane 120 discussed above with regard to FIG. 1, in some embodiments. Control plane 220 may handle management requests (e.g., from services 250) as well as other management operations (e.g., dynamic updates) for enforcing usage quotas across services in different provider network regions, as discussed below with regard to FIG. 3. As illustrated in FIG. 2, control plane 220 may implement usage rule distribution 222, in some embodiments. Usage rule distribution 222 may receive a quota request, generate one (or multiple) rules for enforcing the quota, store a copy of the generated rules in rule store 224, and then send the rule(s) to the appropriate rule enforcement component 252 of the service 250. In various embodiments, control plane 220 may implement service deployment 226 to deploy, identify, or otherwise establish communication with rule enforcement 252 at services 250.

Usage control service 210 may implement data plane 230, in some embodiments, which may be similar to data plane 130 discussed above with regard to FIG. 1. Data plane 230 may coordinate and synchronize usage data for use across different components within a service (e.g., at different request handling nodes of a service 250) and across services (e.g., across different ones of services 250) of a provider network, in some embodiments. In some embodiments, data plane 230 may implement tenant usage synchronization 232. Tenant synchronization 232, as discussed below with regard to FIG. 4, may collect usage data from across services for distribution to rule enforcement 252. In this way, rule enforcement 252 may make optimal enforcement decisions. Data plane 230 may also implement usage log store 234, in some embodiments. Usage log store 234 may provide a log-structured or log-based storage system that receives log records that indicate usage metrics for different requests (or indications that are used to create log records) and stores the log records for analysis by usage log analysis 236. In some embodiments, as discussed below with regard to FIG. 5, records from different services may be combined in the same log to identify, among other features of the usage data, dependencies and the cause of usage overruns between services (e.g., between different ones of services 250. Data plane 230 may implement usage log analysis 236 in in order to perform the various time or cross service analyses for usage in order to determine updates to usage quotas for tenants, in some embodiments.

In various embodiments, a provider network may implement monitoring service 240. Monitoring service 240 may provide monitoring and observability for clients (e.g., customers of services 250), including some of the usage data collected for usage control service 210. For instance, as discussed in detail below with regard to FIG. 4, monitoring service 240 may detect events or alarms based on usage data, or may provide insight for recognizing client load or other problems that cause throttling or other enforcement actions, in some embodiments.

Generally speaking, clients 270 may encompass any type of client configurable to submit network-based requests to provider network regions 200 via network 260, including requests for other services 250 (e.g., a request to create a database, start a computation job, setup a data stream, etc.). In some embodiments, operators of a service (e.g., service 250) may be a client 270 that performs requests to specify usage quotas, in some embodiments. For example, a given client 270 may include a suitable version of a web browser, or may include a plug-in module or other type of code module configured to access a management console to specify a usage quota for a tenant. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 270 may be an application configured to interact directly with provider network region 200. In some embodiments, client 270 may be configured to generate network-based services requests according to a Representational State Transfer (REST)-style network-based services architecture, a document- or message-based network-based services architecture, or another suitable network-based services architecture. Although clients 270 are illustrated as external to provider network 200, in some embodiments clients of different services, like other services 250, can be implemented within provider network region 200 (e.g., implemented on a resource of another service 250, such as virtual compute instance).

Clients 270 may convey network-based services requests to and receive responses from provider network regions 200 via network 260. In various embodiments, network 260 may encompass any suitable combination of networking hardware and protocols necessary to establish network-based-based communications between clients 250 and provider network regions 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 270 and provider network region 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 270 and the Internet as well as between the Internet and provider network region 200. It is noted that in some embodiments, clients may communicate with provider network region 200 using a private network rather than the public Internet.

Figure 3:
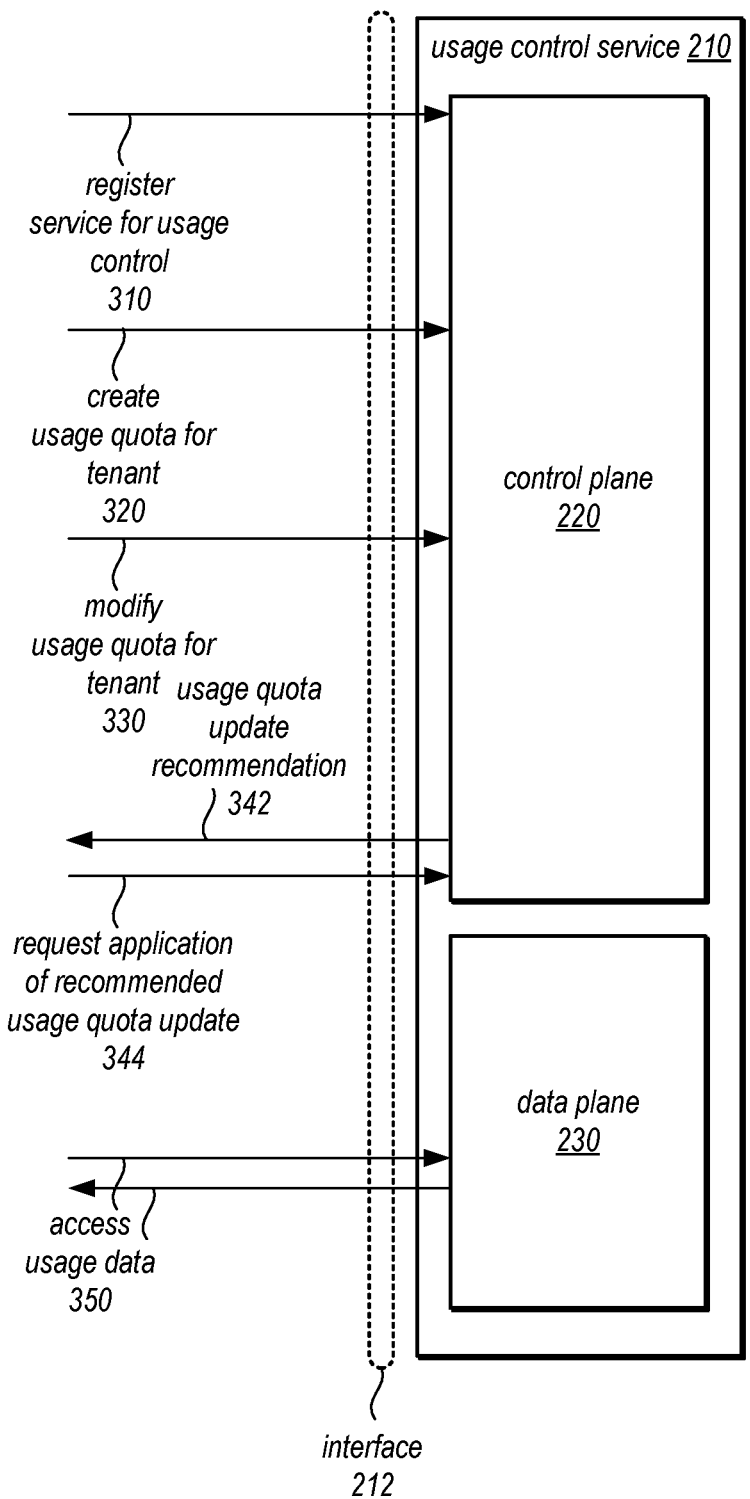
FIG. 3 illustrates a logical block diagram implementing an example interface for a usage control service, according to some embodiments.

FIG. 3 illustrates a logical block diagram implementing an example interface for a usage control service, according to some embodiments. As illustrated in FIG. 3, usage control service 210 supports various requests for usage quota enforcement. For example, as indicated at 310, a request to register a service for usage control may be received, in some embodiments. The request 310 may specify the service to begin enforcing usage control, a configuration of the service to enforce usage quotas (e.g., a number, location, and configuration of rule enforcement agents, or where to deploy rule enforcement agents), and/or other service-wide enforcement parameters (e.g., whether dynamic updates may be applied/or not applied, what types of enforcement actions (e.g., dropping requests, error responses, slowing requests, etc.). Registration request 310 may identify the interface(s) to which usage control may be enforced (e.g., a list of APIs to which different usage controls may be created).

Registration request 310 may trigger deployment of rule enforcement agents in some embodiments. For example, an installation file for a rule enforcement agent may be sent for execution by service deployment 226 to different request handling nodes for installation. In some embodiments, registration request 310 may trigger an initialization protocol or other setup workflow to establish communications between request handling nodes (at which a service operator may be implemented a rule enforcement agent or feature) and usage control service. For instance, communication links between data plane 230 and the request handling nodes to allow request handling nodes to read from and/or write data plane data (e.g., a log storage system, rule updates or other synchronization information).

Interface 212 may support a request to create a usage quota for a tenant, as indicated at 320, in some embodiments. For example, in various embodiments, a usage quota may be specified as an absolute value range (e.g., up to 15 RPS) or as a relative value range (e.g., up to 5% of available resource X). The usage quota may be specified as a usage amount (e.g., 10 Gigabytes of memory) or usage as performance (e.g., average time to perform a request), in some embodiments. Multiple resources may be specified in a usage quota, in some embodiments. For example, both network bandwidth and processor utilization may be specified for a usage quota for a particular tenant. The creation request 320 may specify an interface (e.g., API) for which the usage control is enforced. For example, an interface may have an identifier or other indicator established when the service was registered (e.g., a numerical identifier or the function, method, or other programmatic name used to invoke the interface). The request to create 320 may also identify a tenant of the service to which the usage quota applies. For example, a tenant may be client identifier unique to an individual client application, a customer or group account that can be provided as part of requests received from multiple different client applications, and/or another service.

Interface 212 may support manual modification of usage quotas for tenant, as indicated by request 330. For instance, various usage quota parameters may be changed, including the usage quota values, a specification of the tenant (e.g., add an account identifier to which the usage quota is applicable). These modifications may be made in addition to the automated modifications or recommendations that are dynamically detected and provided, as discussed below with regard to FIGS. 4 and 5. In some embodiments, a manual usage quota modification may override a dynamic update. For example, in certain disaster scenarios (e.g., network component failure, undetected traffic surges, dependencies being broken, etc.), an operator may wish to alter usage quotas to ensure an optimal experience for all tenants. Usage control service 210 allows for such intervention by letting the service owner operator push rule manual modifications as overrides, in such embodiments.

Interface 212 may support various formats for specifying the registration (310) and/or creation (320)/modification (330) of usage quota enforcement. For example, respective API calls may allow for the specification of various request features as parameters in the request. In some embodiments, a file or document using a script language (e.g., human-readable scripting languages) that specifies one (or multiple) tenant quotas may be supported. For example, a request to create a usage quota for a tenant 320 may be performed as part of a usage quota upload transmission included in a JavaScript Object Notation (JSON) document, in some embodiments.

Interface 212 may support providing recommendations for dynamically determined updates to usage quotas for tenants, in some embodiments. For example, recommendation 342 of a usage quota update may be provided as a notification message, a display indicator, or other interface feature to identify a usage quota change to be applied as an update to the usage quota previously specified in a request (e.g., at 310) or in a previous dynamic update to the usage quota. In various embodiments, interface 212 may support a feature to request (e.g., confirm) the application of the recommended usage quota update.

In addition to support the enforcement usage quotas, usage control service 210 may also provide insight to service operators by providing access to usage data collected for tenants. For example, interface 212 may support one or more types or formats of access request for usage data, as indicated 350. In some embodiments, the requests 340 may be supported using specific lookup APIs with parameters to identify a tenant (or group of tenants), time range, and usage data type. In some embodiments, access usage data 350 may be implemented using a database interface or other standardized query interface (e.g., supporting Structured Query Language (SQL)).

As noted above, services may implement components to impose the usage quotas specified at a usage control system. FIG. 4 illustrates a logical block diagram of a rule enforcement agent for a usage control service, according to some embodiments. Service request handling nodes 410 may be implemented as part of a service that has registered for usage control by usage control service. Request handling nodes 410 may be implemented as part of a front-end or other request dispatch, in some embodiments. In some embodiments, request handling nodes 410 may be implemented as part of dedicated fleet or components set aside to implement usage controls (as part of the service).

Rule enforcement agent 412 may be deployed or implemented as part of service handling nodes 410 (e.g., as a separately executing process or application, or as a library or other code that is integrated into the request handling application executing on service request handling nodes 410). Request handling nodes 410 may receive tenant requests 422 and determine whether a usage enforcement action should be applied to the tenant request 422, as discussed in detail below with regard to FIG. 8. A rule (or updated rule) may be received, as indicated at 402, to enforce for a tenant (as discussed above with regard to FIGS. 1 and 3). If (or when) the tenant request is allowed, then rule enforcement agent 412 may allow for the request to proceed, as indicated 424. Note that in some embodiments, allowed tenant requests may be performed at service request handling nodes and thus allowed tenant requests may be handled and, if expected, a response returned.

Rule enforcement agents 412 may also collect or obtain usage measurements for subsequent quota enforcements, in some embodiments. For example, rate information, resource utilization information, performance information, or other usage measurements may be tracked (or obtained from other service request handling node components) that describe usage of a tenant for an interface. Tenant usage measurements 442 may be provided to data plane 230, in some embodiments. Data plane 230 may store these usage measurements as log records in usage log store 224, in some embodiments. In some embodiments, tenant usage measurements may be synchronized or otherwise combined with other tenant usage information collected from other service handling nodes by tenant usage synchronization 222. Tenant usage synchronization 222 may implement a push-based synchronization technique, in some embodiments, sharing other tenant usage information 444 enforcing a rule (e.g., how much usage the same tenant has at other service request handling nodes). In some embodiments, tenant usage synchronization 22 may implement a pull-based synchronization technique where rule enforcement agents 412 request other tenant usage information 444.

Figure 4:
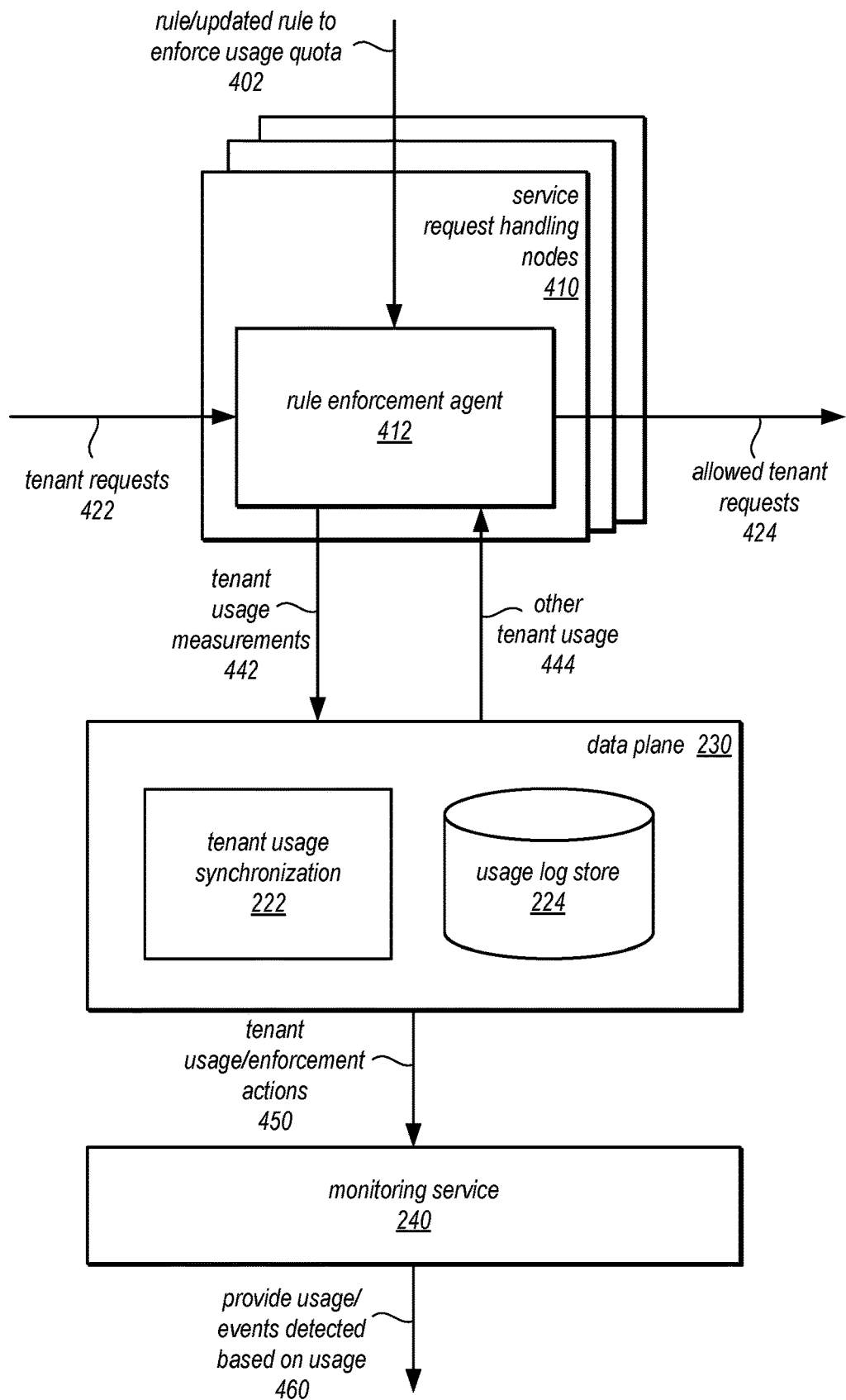
FIG. 4 illustrates a logical block diagram of a rule enforcement agent for a usage control service, according to some embodiments.
Figure 5:
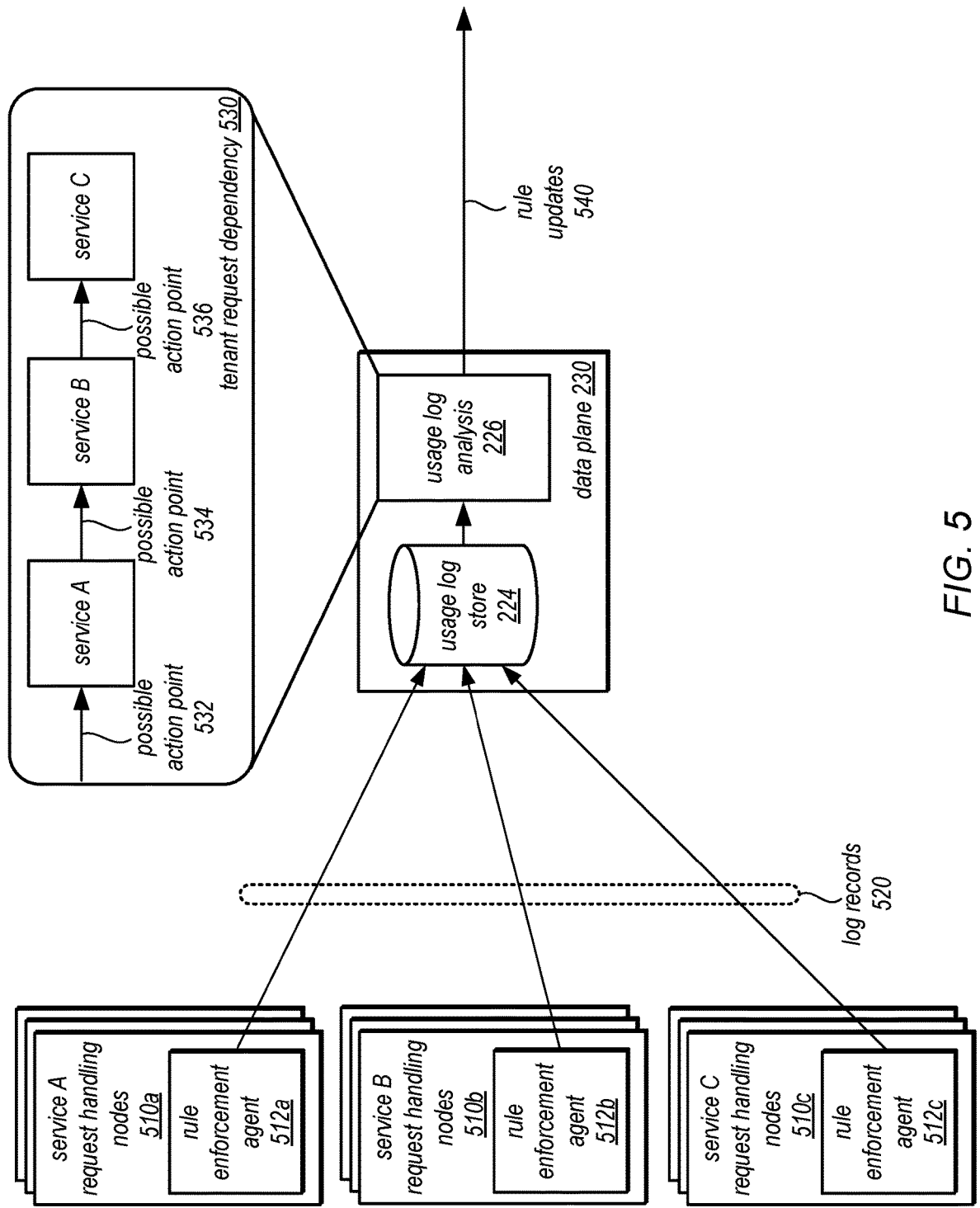
FIG. 5 illustrates a logical block diagram of usage log analysis, according to some embodiments.

As illustrated in FIG. 4, in some embodiments, tenant usage information and enforcement actions taken against a tenant 450 may be provided to monitoring service 240. Monitoring service 240 may provide tenants access to tenant usage information specific to the tenant via the various monitoring, display, or other observability features of monitoring service 240. For example, monitoring service 240 may indicate how, when, and for what interface enforcement actions to reduce usage for a tenant were taken. This information may be used to provide, as indicated at 460, usage and events detected based on usage (e.g., an event detected when a number of enforcement actions exceeds a threshold) to notify a tenant.

Dynamic updates to usage quotas (and the rules that enforce usage quotas) may be performed, in various embodiments. Instead of dynamic adjustments made from the perspective of an individual request handling node, techniques for dynamic cross-service usage enforcement may make dynamic updates based on usage across the whole service as well as other services. FIG. 5 illustrates a logical block diagram of usage log analysis, according to some embodiments.

Data plane 230 may implement usage log store 224, as discussed above. Usage log store 224 may accept log records 520 (or information that is converted into log records by data plane 230) that describe the performance of various requests. Usage log store 224 may collect log records from across multiple services, such as service A, service B, and service C. Respective request handling nodes and rule enforcement agents for these services, such as request handling nodes 510a, 510b, and 510c and rule enforcement agents 512a, 512b, and 512c, may emit, send, or otherwise transmit log records 520 to store in usage log store 224. These log records may be stored in a common log, in some embodiments.

Usage log analysis 226 may implement various techniques to, among other analyses, infer information about traffic patterns which can lead to intelligent load shredding or other enforcement decisions to uphold usage quotas and make rule updates 540. For example, in some embodiments usage log analysis 226 may determine usage measurements for requests were and can come up with results like tenant X's 30 requests consumed more resources then tenant Y's 100 requests. In some embodiments, usage log analysis 226 can determine in which state a service was not stressed even when serving the peak usage (e.g., peak traffic) for tenants. Results of these analyses may then drive updates to usage rules, for example, by specifying an increase or decrease to a usage quota for a tenant (which the control plane 220 can translate into an updated rule).

In some embodiments, usage log analysis 226 can also determine the amount of resources that requests actually consume, as it may not be apparent when the request is processed from the perspective of an individual request handling node/rule enforcement agent. For example, when a request enters the service, it may not be possible to determine before performance of the request the number of resources that request will consume. However, when the request has processed, usage log analysis can examine associated log records to determine the usage and dynamically adjust the rules for a next request when it comes in for that tenant.

Usage log analysis 226 may detect dependencies between services, in various embodiments, in order to determine the appropriate rule updates. For example, a tenant request dependency 530 may illustrate that a tenant's request received at service A may also cause requests to service B and service C. Each of these requests may represent different enforcement action points, such as possible action points 532, 534, and 536. In order to make a determination about which enforcement action point is best to enforce for controlling a particular tenant's use. For instance, possible action point 532 may be selected for a tenant as the load provided by requests to service B and service C from service A may also include other tenants not exceeding their usage quotas. Likewise, possible action point for service C may be selected in the event that service B is exceeding its usage quota (though that a tenant of service A is not).

In some embodiments, usage log analysis 226 may implement various weighting schemes to weight the usage measurements across multiple services to determine an overall performance usage (e.g., a single performance score), which can be used to determine whether the request (or subsequent similar requests) exceed usage quotas. In some embodiments, usage log analysis 226 may implement time-series evaluations to determine usage patterns and make predictions for changes in usage of different tenants, which may also be used to determine when to make rule updates 540, in some embodiments. For example, predicting likely usage increases for some tenants may allow for adjustments to that tenant's quota to be made in order to prevent unnecessary enforcement actions (as other tenants' predicted usage may not strain the service).

Although FIGS. 2-5 have been described and illustrated in the context of a data lineage service, the various techniques and components illustrated and described in FIGS. 2-5 may be easily applied to other usage control systems in different embodiments that may implement cross-service usage controls. As such, FIGS. 2-5 are not intended to be limiting as to other embodiments of a system that may implement system-independent data lineage modeling, tracking, or analysis.

Various different systems and devices may implement the various methods and techniques described below, either singly or working together. For example, a usage control service such as described above with regard to FIGS. 2-5 may be configured to implement the various methods. Therefore, the above examples and or any other systems or devices referenced as performing the illustrated method, are not intended to be limiting as to other different components, modules, systems, or configurations of systems and devices.

Figure 6:
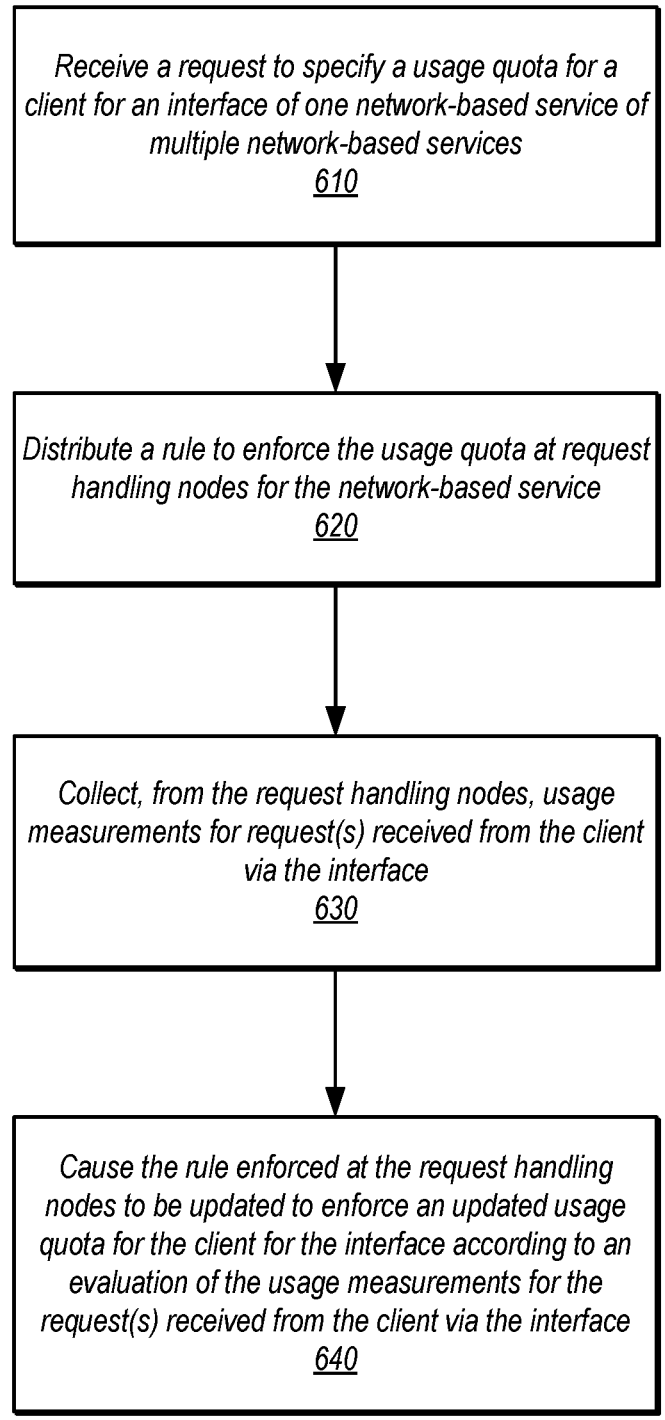
FIG. 6 is a high-level flowchart illustrating various methods and techniques to implement dynamic cross-service usage enforcement, according to some embodiments.

FIG. 6 is a high-level flowchart illustrating various methods and techniques to implement dynamic cross-service usage enforcement, according to some embodiments. As indicated at 610, a request to specify a usage quota for a client for an interface of one network-based service of multiple network-based services may be received, in some embodiments. As discussed above, the request may be a request to create a usage quota for an individual client (e.g., an individual tenant) or may be received as part of a larger usage control configuration request that provides different usage quotas for multiple different clients. In some embodiments, a default usage quota may be specified for clients not specifically enumerated in a configuration or other request.

As indicated at 620, a rule to enforce the usage quota may be distributed to request handling nodes for the network-based service, in some embodiments. The usage quota may be used to determine the rule to distribute. For example, if a usage quota is to allow requests up to a specified rate, then that rate amount may be divided amongst request handling nodes (e.g., in scenarios where each request handling node handles a portion of the overall requests for the client), such as dividing a 40 TPS rate amongst for request handling nodes as having quotas of 10 TSP each. In some embodiments, the rule may enforce the usage quota without dividing or distributing the usage amongst request handling nodes, such as providing a rule for a 40 TPS rate to each request handling node.

Dynamic updates to rules may be made, as discussed in various scenarios above. As indicated at 630, usage measurements for requests received from the client via the interface may be collected, in some embodiments. For instance, a common storage, such as the usage log store, or other centralized data collection component may be implemented to receive (and/or request) usage measurements. In some embodiments, tokens, identifiers, or other tracing information that maps requests to particular clients (e.g., to tenants) may be used to aggregate usage measurements for requests from a same client that cause performance across multiple different services in order to collect the usage caused by requests that may not be known by examining usage at an individual service.

As indicated at 640, the rule enforced at the request handling nodes may be caused to be updated to enforce an updated usage quota for the client for the interface according to an evaluation of the usage measurements for the request(s) received from the client via the interface, in some embodiments. For example, the same type of request received from different clients may cause different consumption of resources. If an expected usage for an initial determination of a rule for a usage quota is more than an actual usage determined from the usage measurements, the usage rule may be updated to increase the number of requests in such a scenario. In another example, a rule may be updated to lessen the usage quota for a client according to a determination that the rate of client requests is overloading the capacity of dependent services to handle requests from the one service. Update of the rule may, as discussed above, be distributed by a rule distributer, or other synchronization component to the request handling nodes, in some embodiments.

Updates to rules may be automatically applied, in some embodiments. For example, pre-authorization may be granted for a cross-service utilization enforcement system to change the usage quotas of tenants for services (e.g., within an acceptable boundary of change). In some embodiments, updates to the usage quota may be provided as recommendations, which are then accepted (or rejected). A request to apply the recommendation can then be received, responsive to which the update of the rule enforced is caused.

Figure 7:
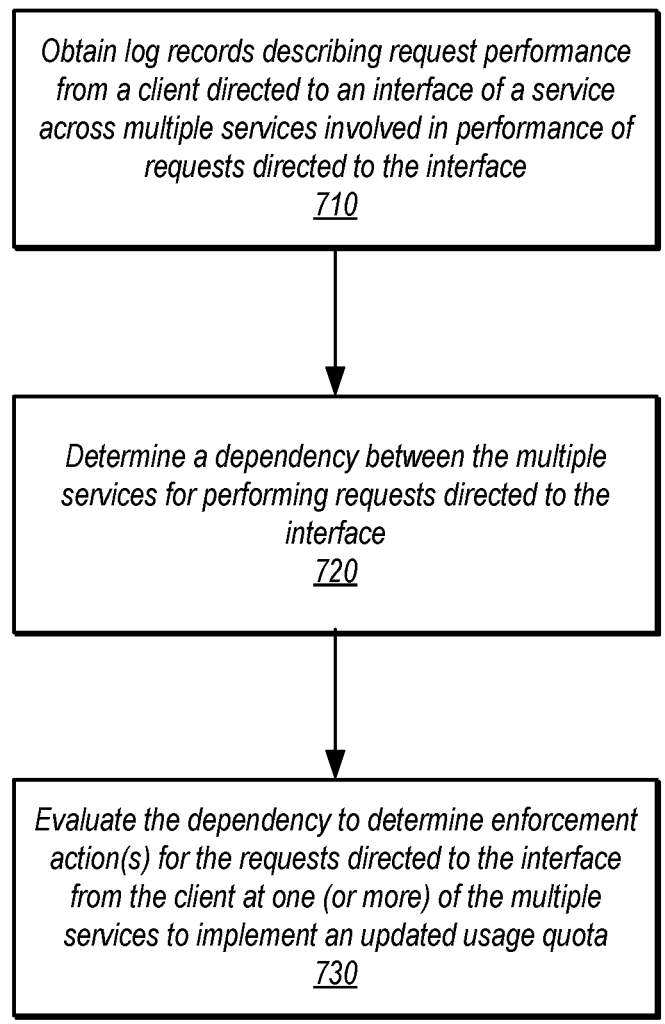
FIG. 7 is a high-level flowchart illustrating various methods and techniques to implement dynamically updating a usage quota for a client from cross-service performance, according to some embodiments.

Various types of update determinations may be made for rules to enforce a usage quota as discussed above with regard to FIGS. 1, 5, and 6. In some scenarios, the impact of requests may cross service boundaries. Therefore usage quotas may be updated to account for the cross-service effects of requests. FIG. 7 is a high-level flowchart illustrating various methods and techniques to implement dynamically updating a usage quota for a client from cross-service performance, according to some embodiments.

As indicated at 710, log records may be obtained describing request performance from a client directed to an interface of a service across multiple services involved in performance of requests directed to the interface, in some embodiments. For example, as depicted in FIG. 5, different log records can be collected from the request handling nodes of different services. These log records may have tracing or other information included in the records to associate performance information for a requests from a client directed to an interface at a service (e.g., by a token or other identifier included in request information).

As indicated at 720, a dependency between the multiple services for performing requests directed to the interface may be determined from the log records, in some embodiments. For example, a graph or other data structure that links the performance of a request across different services may be constructed from the log records based on timestamps or other ordering information for log records. As indicated at 730, the dependency may be evaluated to determine enforcement action(s) for the requests directed to the interface from the client at one (or more) of the multiple services to implement an updated usage quota, in some embodiments. For instance, the dependency may indicate which service is a performance bottle neck and whether (or not) requests from the client are the cause of the bottleneck. If so, then the enforcement action could be selected to constrain requests from the client prior to the bottleneck service in order to match the requests to the capacity of the requests to be processed at the bottleneck service.

Figure 8:
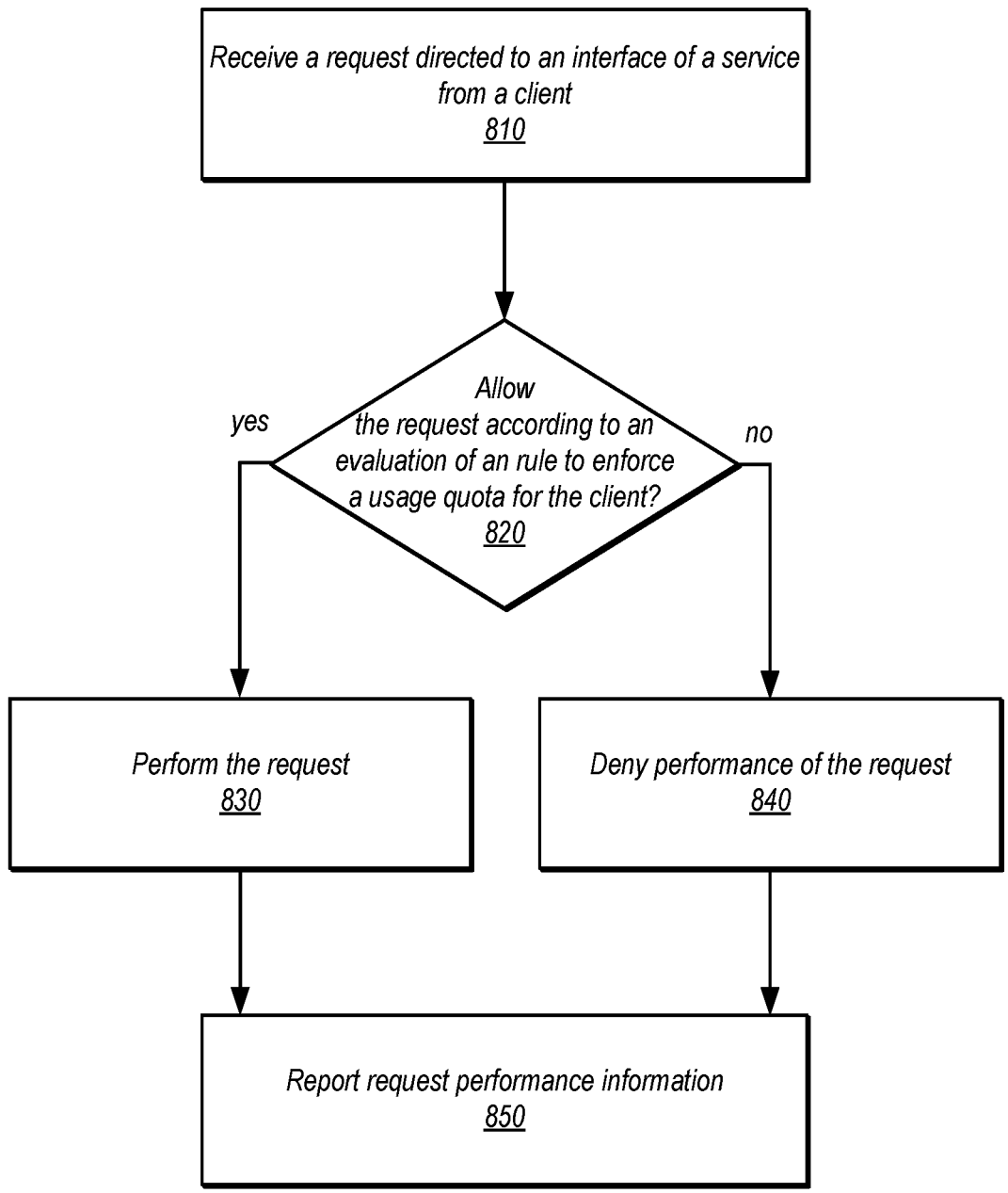
FIG. 8 is a high-level flowchart illustrating various methods and techniques to implement enforcing a usage quota according to a usage rule for a client, according to some embodiments.

Enforcement of usage quotas may rely upon rules distributed to request handling nodes of a service. FIG. 8 is a high-level flowchart illustrating various methods and techniques to implement enforcing a usage quota according to a usage rule for a client, according to some embodiments. As indicated at 810, a request directed to an interface of a service may be received from a client, in some embodiments. A determination may be made as to whether to allow the request according to an evaluation of a rule to enforce a usage quota for the client, as indicated at 820, in some embodiments. For example, a rule may be evaluated using an estimated usage (e.g., an estimated performance measurement) for each request and determine whether by allowing the request a total usage (e.g., for a period of time) exceeds the threshold specified by the rule. In some embodiments, a rule may apply rate limiting or other evaluations without estimating request usage, as in such embodiments, the rule may account for an estimated usage of the request by specifying the rate limitation (or other condition) using the estimated usage assumption or factor in determining the limitation (or other condition).

If allowed, the request may be performed, as indicated at 830. Performance information, including performance or other usage information collected at other services invoked by performing the request may be collected and reported as part of request performance information, as indicated at 850. For example, such performance information may be used for determining dynamic updates to usage quotas, as discussed above. If not allowed, then as indicated at 840, performance of the request may be denied (e.g., by dropping, returning error, etc.). Performance information for the request (e.g., that it was not performed), may also be reported, as indicated at 850.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 9:
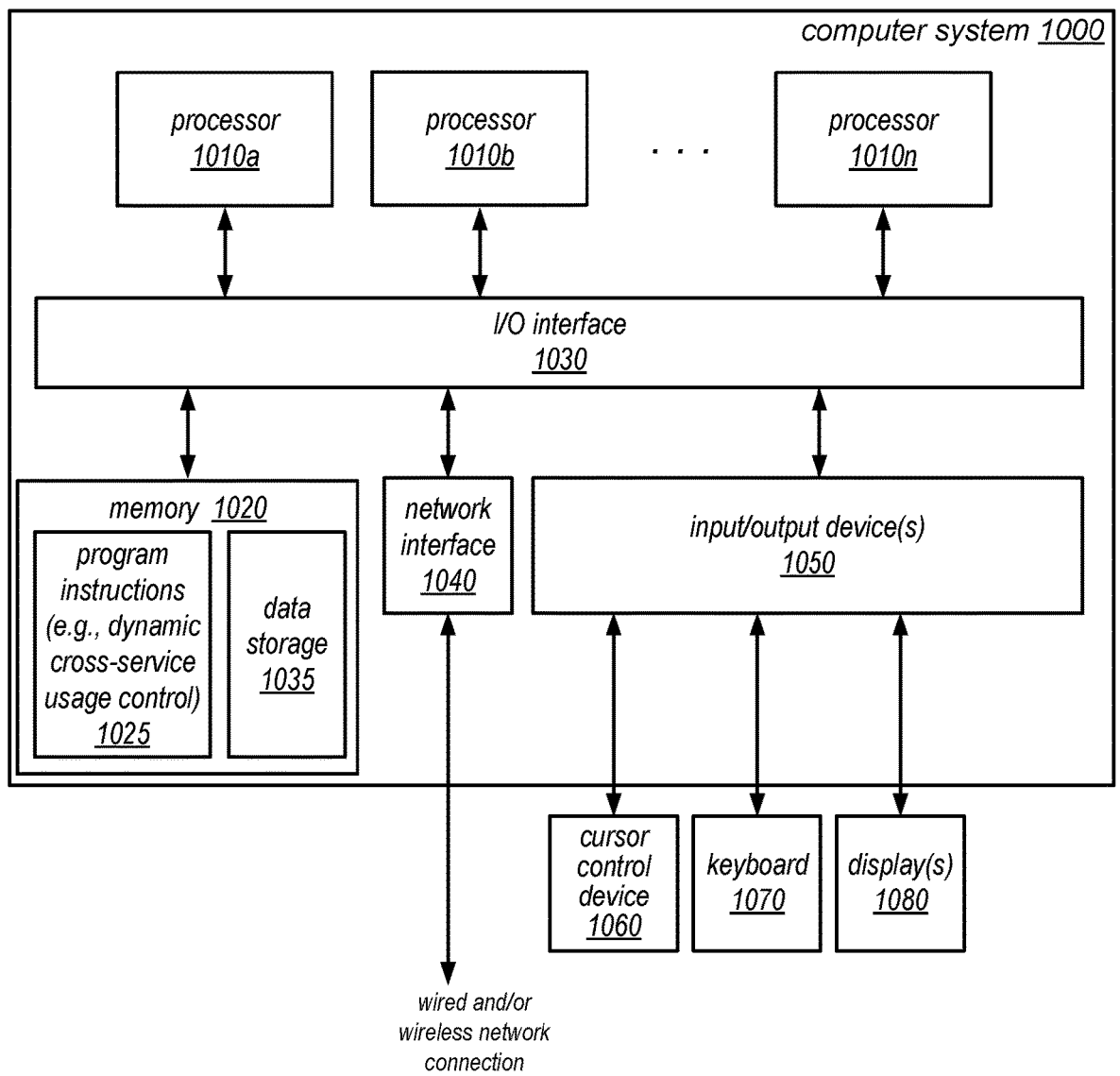
FIG. 9 illustrates an example system configured to implement the various methods, techniques, and systems described herein, according to some embodiments.

Embodiments of dynamic cross-service usage control as described herein may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of compute node, computing device, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., cross-service control plane, data plane, request handling nodes, rule enforcement agents, and so on) are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 9, memory 1020 may include program instructions 1025, configured to implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, nodes within a data lineage system may present data lineage services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   a plurality of compute nodes, respectively comprising at least one processor and a memory;
   a first one or more of the plurality of compute nodes, configured to implement a control plane for a cross-service usage control system, the control plane configured to:
      receive a request to specify a usage quota for a tenant for an interface of a multi-tenant network-based service of a plurality of different multi-tenant network-based services;
      generate a rule to enforce the usage quota at a plurality of request handling nodes for the multi-tenant network-based service;
      send the rule to the plurality of request handling nodes for the multi-tenant network-based service;
   a second one or more of the plurality of compute nodes, configured to implement a usage log analyzer for the cross-service usage control system, the usage log analyzer configured to:
      receive log records from the plurality of different multi-tenant services that describe usage measurements for requests from tenants of the different multi-tenant network-based services, wherein the usage measurements correspond to different types of resources hosted at the plurality of multi-tenant network-based services utilized by the requests;
      evaluate one or more of the log records for one or more requests received from one or more clients associated with the tenant via the interface, wherein the evaluation:
         determines an update to the usage quota for the tenant, based at least in part on one of the usage measurements in the one or more log records associated with a different tenant;
         determines different ones of the plurality of multi-tenant services that are included in a dependency detected between the multi-tenant network-based service and one or more other multi-tenant network-based services of the plurality of multi-tenant network-based service according to the one or more log records; and selects an action point for enforcing the usage quota for the tenant from a plurality of different action points corresponding to the determined different ones of the plurality of multi-tenant network-based services; and wherein the one or more log records are received from at least one of the plurality of request handling nodes for the multi-tenant network-based service; and wherein the control plane is further configured to:
send an updated rule to the plurality of request handling nodes to enforce the updated usage quota for the tenant for the interface at the action point determined by the usage log analyzer.

2. The system of claim 1, wherein to evaluate the one or more of the log records for one or more requests received from the one or more clients associated with the tenant via the interface, the usage log analyzer is configured to detect the dependency between the multi-tenant network-based service and the one or more other multi-tenant services of the plurality of multi-tenant network-based services.

3. The system of claim 1, further comprising:
the request handling nodes for the multi-tenant network-based service, respectively implementing a rule enforcement agent, the rule enforcement agent configured to:
receive a request from the tenant directed to the interface; and
evaluate the rule to enforce the usage quota to determine that the request is allowed.

4. The cross-service usage control system of claim 1, wherein the different multi-tenant network-based services are implemented as part of a provider network across a plurality of different regions, wherein the cross-service usage control system is implemented as another service of the provider network, wherein the provider network implements a monitoring service, and wherein usage information based on the described usage measurements is sent to the monitoring service to provide access to tenant-specific usage information.

5. A method, comprising:
receiving a request to specify a usage quota for a client associated with a tenant for an interface of one network-based service of a plurality of different network-based services;
distributing a rule to enforce the usage quota at a plurality of request handling nodes for the network-based service;
collecting usage measurements for a plurality of different tenants, including the tenant, for a plurality of different requests, including the one or more requests received from the client via the interface, from the plurality of different network-based services, wherein the respective usage measurements correspond to different types of resources hosted at the more than one different network-based services utilized by the one or more requests;
evaluating the usage measurements for the plurality of different tenants, wherein the evaluating:
determines an update to the usage quota for the tenant, based at least in part on one of the usage measurements in the one or more log records associated with a different tenant;
determines different ones of the plurality of network-based services that are included in a dependency detected between the network-based service and one or more other network-based services of the plurality of network-based service according to the one or more log record; sand selects an action point for enforcing the usage quota for the tenant from a plurality of different action points corresponding to the determined different ones of the plurality of network-based services; and causing the rule enforced at the plurality of request handling nodes to be updated to enforce an updated usage quota for the client for the interface at the action point.

6. The method of claim 5, further comprising:
receiving a request that specifies a manual modification to the usage quota for the client for the interface; and
causing a further update to the rule to enforce the modified usage quota at the plurality of request handling nodes for the network-based service.

7. The method of claim 5, further comprising:
receiving a request to register the network-based service for enforcing usage control, wherein the interface is an Application Programming Interface (API), and wherein the request to register the network-based service specifies the API as one of a plurality of APIs for enforcing usage controls.

8. The method of claim 7, further comprising:
responsive to receiving the request, causing deployment of respective rule enforcement agents at the plurality of request handling nodes.

9. The method of claim 5, further comprising:
receiving a request to access usage data collected for the interface including the collected usage measurements for the one or more requests received from the client via the interface; and
responsive to the request, providing the requested usage data.

10. The method of claim 5, wherein causing the rule enforced at the plurality of request handling nodes to be updated to enforce the updated usage quota for the client for the interface at the action point is performed automatically in response to determining the updated usage quota.

11. The method of claim 5, further comprising:
performing, by a rule enforcement agent at one of the request handling nodes:
receiving a request from the client directed to the interface;
evaluating the rule to enforce the usage quota to determine that the request is not allowed; and
denying performance of the request.

12. The method of claim 5, wherein the evaluating further comprises:
detecting the dependency between the network-based service and one or more other network-based services of the plurality of network-based services based on the usage measurements.

13. The method of claim 5, further comprising:
providing, via the interface, a recommendation to apply the updated usage quota; and
wherein causing the rule enforced at the plurality of request handling nodes to be updated to enforce the updated usage quota for the client for the interface at the action point is performed in response to receiving a request to perform the recommendation to apply the updated usage quota at the network-based service.

14. One or more non-transitory, computer-readable storage media, storing program instructions that when executed on or across one or more computing devices cause the one or more computing devices to implement:

receiving a request to specify a usage quota for a client associated with a tenant for an interface of one network-based service of a plurality of different network-based services;

generating a rule to enforce the usage quota at a plurality of request handling nodes for the network-based service;

sending the rule to the plurality of request handling nodes for the network-based service;

receiving an update for the rule determined, at least in part, from usage measurements for a plurality of different tenants, including the tenant, for a plurality of different requests including the one or more requests received from the client via the interface, from the plurality of different network-based services, wherein the respective usage measurements correspond to different types of resources hosted at the more than one different network-based services utilized by the one or more requests;

evaluating the usage measurements to:
  determine different ones of the plurality of network-based services that are included in a dependency detected between the network-based service and one or more other network-based services of the plurality of network-based service according to the one or more log record; and
  select an action point for enforcing the usage quota for the tenant from a plurality of different action points corresponding to the determined different ones of the plurality of network-based services;

sending the update to the rule to the plurality of request handling nodes to enforce an updated usage quota for the client for the interface at the selected action point, and wherein the update to the usage quota for the tenant is based at least in part on one of the usage measurements in the one or more log records associated with a different tenant.

15. The one or more non-transitory, computer-readable storage media of claim 14, wherein, in evaluating the usage measurements, the program instructions cause the one or more computing devices to implement detecting the dependency between the network-based service and one or more others of the plurality of network-based services.

16. The one or more non-transitory, computer-readable storage media of claim 14, storing program instructions that when executed on or across the one or more computing devices cause the one or more computing devices to further implement:
  receiving a request that specifies a manual modification to the usage quota for the client for the interface; and
  sending a further update to the rule to enforce the modified usage quota at the plurality of request handling nodes for the network-based service.

17. The one or more non-transitory, computer-readable storage media of claim 14, storing program instructions that when executed on or across the one or more computing devices cause the one or more computing devices to further implement:
  generating a different rule to enforce a default usage quota at the plurality of request handling nodes for a different client of the network-based service; and
  sending the different rule to the plurality of request handling nodes.

18. The one or more non-transitory, computer-readable storage media of claim 14, storing program instructions that when executed on or across the one or more computing devices cause the one or more computing devices to further implement:
  receiving a request to register the network-based service for enforcing usage control, wherein the interface is an Application Programming Interface (API), and wherein the request to register the network-based service specifies the API as one of a plurality of APIs for enforcing usage controls.

19. The one or more non-transitory, computer-readable storage media of claim 18, storing program instructions that when executed on or across the one or more computing devices cause the one or more computing devices to further implement:
  responsive to receiving the request, causing deployment of respective rule enforcement agents at the plurality of request handling nodes.

20. The one or more non-transitory, computer-readable storage media of claim 14, wherein the update to the rule comprises an update to an estimated usage to perform requests directed to the interface.

* * * * *